United States Patent [19]

Biffle et al.

[11] Patent Number: 4,956,805
[45] Date of Patent: Sep. 11, 1990

[54] CIRCUITRY FOR CHARACTER TRANSLATE FUNCTIONS

[75] Inventors: L. Leslie Biffle, Cave Creek; Chad R. Larson, Scottsdale, both of Ariz.

[73] Assignees: Anasazi, Inc.; International Anasazi, Inc., both of Phoenix, Ariz.

[21] Appl. No.: 99,754

[22] Filed: Sep. 22, 1987

[51] Int. Cl.[5] ............................................. G06F 9/00
[52] U.S. Cl. ................................ 364/900; 364/925.6; 364/933; 364/933.3
[58] Field of Search ... 364/200 MS File, 900 MS File

[56] References Cited

U.S. PATENT DOCUMENTS

| 4,016,549 | 4/1977 | Hutner | 364/900 |
|---|---|---|---|
| 4,276,594 | 6/1981 | Morley | 364/200 |
| 4,315,308 | 2/1982 | Jackson | 364/200 |
| 4,402,044 | 8/1983 | McDonough et al. | 364/200 |
| 4,422,143 | 12/1983 | Guttog | 364/200 |
| 4,425,626 | 1/1984 | Parmet et al. | 364/200 |
| 4,462,073 | 7/1984 | Grondalski | 364/200 |
| 4,463,421 | 7/1984 | Laws | 364/200 |
| 4,716,543 | 12/1989 | Ogawa et al. | 364/200 |

Primary Examiner—Raulfe B. Zache
Attorney, Agent, or Firm—Limbach, Limbach & Sutton

[57] ABSTRACT

In a data processing system that includes a central processing unit (CPU) which performs functions on data characters based upon a set of program instructions, the central processing unit being of a type that includes: (a) an arithmetic logic unit for performing the functions on the data characters; (b) a plurality of internal registers for storing data characters; (c) a data bus both for transferring data characters internally within the CPU and for transmitting data characters to and receiving data characters from devices external to the CPU; and (d) an address bus for transmitting receiving addresses of referenced program instructions, and wherein the contents of one of the internal registers forms part of the address of the referenced program instruction available on the address bus. The improvement comprising a storage unit which includes a plurality of data character storage locations which are addressed by the contents of the internal register available on the address bus such that the storage location is written if the referenced instruction is an output and read if the referenced instruction is an input.

20 Claims, 5 Drawing Sheets

CIRCUITRY FOR CHARACTER TRANSLATE FUNCTIONS

BACKGROUND OF THE INVENTION

1. Field of the Invention

The present invention relates to data processing systems and, in particular, to circuitry external to a data processing system which utilizes the contents of to map to a new value which is derived from the contents of the register.

2. Discussion of the Prior Art

In a data processing system, there are a number of functions that must be performed on each data character that is received or transmitted by the system. Examples of these mandatory functions include: switching contacts between the normal or "user" state and the state where character interrupts are processed; computing error detection polynomials; translating characters from one code set to another; and testing for normal or abnormal termination of a data stream. It is this required processing that limits the rate at which a computer operates. If the character bandwith of a data communications system is to be maximized, then these functions must be expedited.

In the early development of data processing systems, if high performance communication was required, it was necessary to develop custom hardware for the communications protocol to be implemented. For example, IBM used special, single-protocol hardware for its early Bisync and PARS/IPARS implementations.

In the 1950's, data processing systems that could service "character at a time" interrupts from a single communication line operating at the rate of 2000 bits per second were extremely expensive, specialized systems which were economically beyond the reach of most commercial organizations. With the development of microprocessor integrated circuits, the cost of data communication systems has become more reasonable and their use widespread.

However, as data communications hardware becomes more commonplace, users become more imaginative in its application. The present demand is for a system that permits operation of any communications protocol at data rates of 64000 bits per second over digital communications channels. Using a 6-bit protocol, such as is commonly used in the airline industry, for example, this corresponds to a data rate of 10667 characters per second in each direction, or a perbandwidth data rate of over 21000 characters per second. To support these rates, either custom hardware or expensive "bit-slice" microprocessors would typically be necessary. Unfortunately, these techniques do not provide general solutions and, therefore, force the expenditure of much more development effort for each new protocol than should be required.

Therefore, it would be extremely advantageous if an inexpensive, general purpose solution could be provided to implement the mandatory processing functions associated with differing data communication protocols.

SUMMARY OF THE INVENTION

Accordingly, it is an object of the present invention to enhance the performance of existing data processing systems.

It is also an object of the present invention to expand the instruction set of existing microprocessors.

It is a further object of the present invention to provide circuitry external to a microprocessor architecture to enable high speed character translation functions.

These and other objects of the invention are accomplished by taking advantage of a feature of a particular CPU architecture. According to this CPU architecture, which is exemplified by the Zilog Z80 microprocessor, the contents of an internal data register are made available on the address bus as part of the address of a referenced program instruction. According to the present invention, this portion of the reference address is used to access a corresponding location in an external data storage unit. If the reference is a write, then the accessed storage location in the external unit is written. If the reference is a read, then the contents of the accessed storage location are retrieved. This allows the contents of the internal data register to be replaced with a new value which is derived from the current contents of the register.

Other objects, advantages and features of the present invention will become apparent and be appreciated by referring to the following detailed description of the invention which should be considered in conjunction with the accompanying drawings.

DETAILED DESCRIPTION OF THE INVENTION

Figure 1:
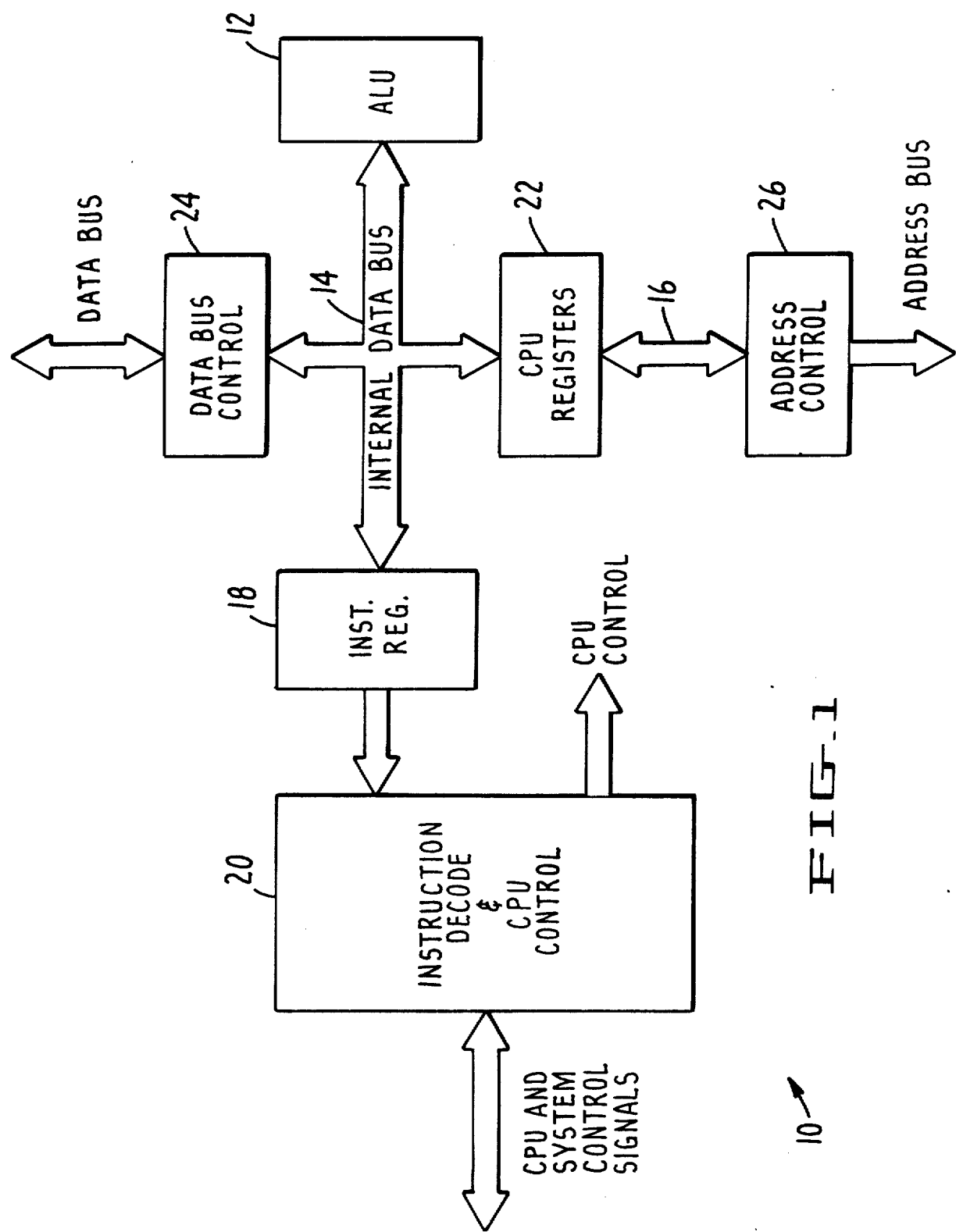
FIG. 1 is a schematic block diagram illustrating the architecture of a data processing system with which the present invention may be utilized.

FIG. 1 illustrates the general architecture of a particular type of central processing unit (CPU) 10, which is exemplified by the Z80 microprocessor manufactured by Zilog Corporation, Cupertino, Calif. The basic elements of CPU 10 include an arithmetic logic unit 12 which performs a variety of functions on data characters provided to CPU 10, an internal data bus 14 for transferring binary information internally between different elements of CPU 10 and an address bus which provides a path for transmitting and receiving program instructions used to control the operation of CPU 10. The data characters, program instructions and intermediate results of operations by CPU 10 are stored in main memory (not shown) and retrieved as dictated by the presently executing instructions. CPU 10 also includes a set of instruction registers which store recently retrieved instructions which will next be processed by instruction decode and CPU control circuitry 20 in accordance with established program flow. A set of internal CPU data registers 22 stores both data characters recently retrieved from main memory as well as the results of preceding operations.

Among the internal data registers 22 is an accumulator register, or A register, which stores the binary result (an 8-bit binary number in the case of the Z80 microprocessor) of the last computation by arithmetic logic unit 12. The contents of the A register are used in combination with a newly retrieved data character in the next operation by ALU 12, the results of which are then entered into the A register.

CPU 10 also includes data bus control 24 and address control 26 for transferring and receiving data characters and address information, respectively, between peripheral devices via the input/output (I/O) ports of CPU 10.

According to the architecture of most microprocessors, the address for a particular data reference or for fetching an instruction to be executed by the system is obtained by providing a binary address on the address bus. The contents of the address are provided by separate internal registers. For example, in the architecture of the Intel 8080 microprocessor, a 16-bit address is provided on the address bus: a memory address being specified by either a field in the instruction itself or by the contents of one of the 8080 internal address registers; an input/output address being specified by an 8-bit field in the I/O instruction. In the case of the I/O instruction, the 16-bit value for the address bus is the single 8-bit value from the instruction repeated twice, giving only 256 possible I/O addresses despite the 16-bit bus width. A one byte data character is either retrieved from or stored to the I/O device addressed by the 16-bit combination of the 8-bit I/O address seen twice.

In contrast, microprocessor architectures such as that of the Zilog Z80 provide the contents of an internal data register to the address bus during I/O bus cycles. Rather than repeating the single 8-bit I/O address, the Z80 combines the 8-bit I/O address with the contents of either the A register (accumulator) or the B register to produce a 16-bit value for the address bus. For example, in the operation of the Z80 microprocessor, the contents of the A register (the primary internal 8-bit data register) is placed on the most-significant half of the 16-bit address bus during a normal Input instruction. This is unusual in that the contents of the internal CPU register appears on part of the address bus during an instruction that fetches a new value for the same register. This makes possible the simultaneous storing from and reading into the A register during a single bus cycle.

The present invention takes advantage of this unusual addressing feature of architectures like that of the Z80.

Thus, in accordance with the present invention, a storage unit and other logic are connected to a Z80-type architecture in such a way as to appear to add very useful instructions to the system's instruction set. This external circuitry replaces the current contents of the internal CPU register with a new value which is derived from the current contents of the same register.

Figure 2:
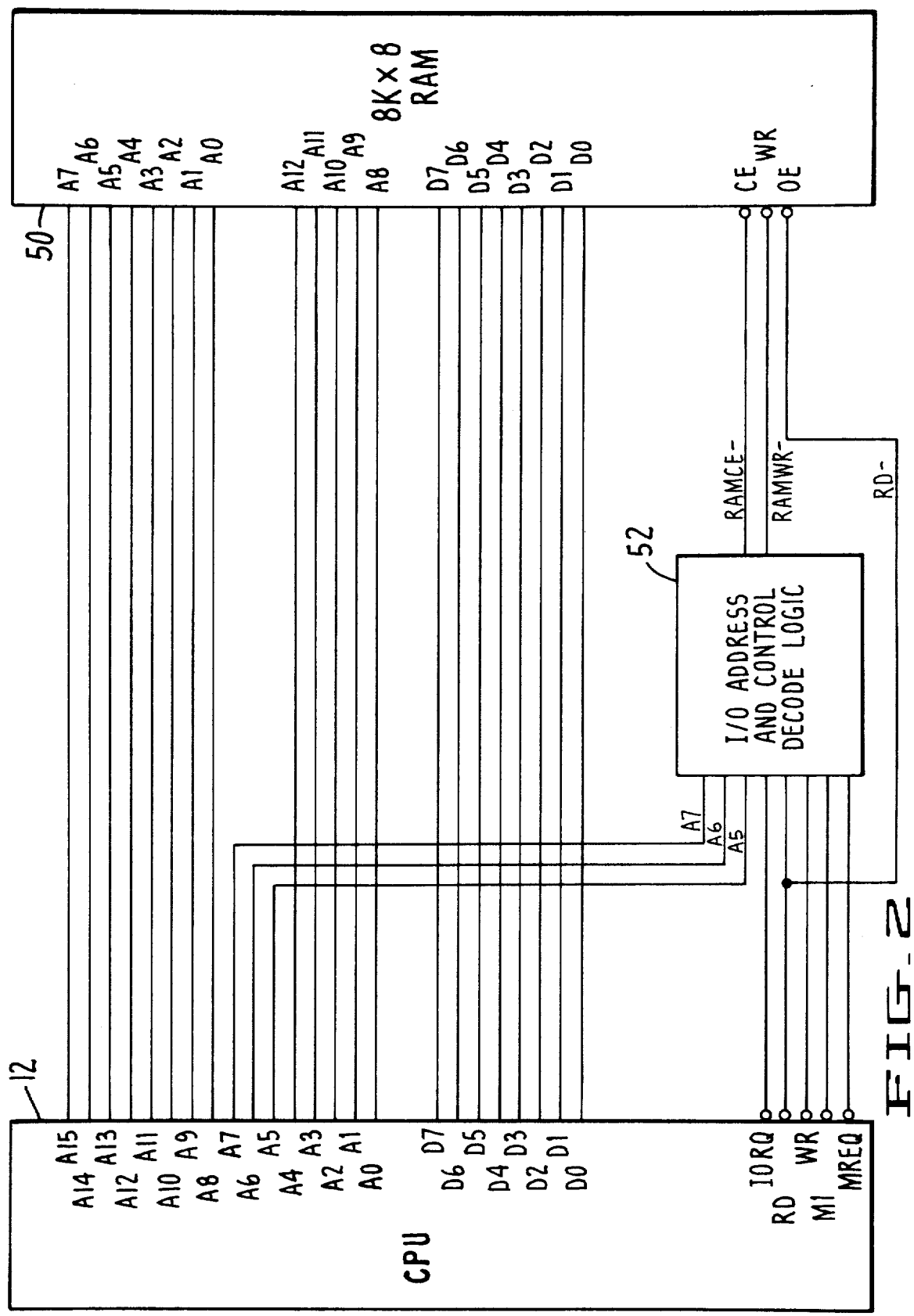
FIG. 2 is a schematic block diagram illustrating the general concept of the present invention.

FIG. 2 provides an example of a simplified implementation of the concept of the present invention. In FIG. 2, an 8K-byte by 8-bit static RAM 50 is connected to a CPU 10 of the Z80-type as follows: the most significant 8 bits A8-A15 of the address bus of CPU 10 are connected to the least significant 8 bits AØ-A7 of address inputs of RAM 50; the remaining 5 bits A8-A12 of the address inputs of RAM 50 are connected to the low order 5 bits AØ-A4 of the address bus of CPU 10. The remaining 3 bits A5-A7 of the address bus of CPU 10, as well as the microprocessor control signals (IORQ, RD, WR, MI, MREQ), are decoded by I/O address and control decode logic 52 to provide device selection for RAM 50 or for any other peripheral devices attached to CPU 10. The RD and WR signals provide read and write control, respectively, of the RAM 50 during I/O operations. The databus DØ-D7 of RAM 50 is connected directly to the data bus DØ-D7 of CPU 10.

In this example, the RAM device 50 is treated as 32 tables, each containing 256 bytes of data. The table to be accessed is selected by the 5-bit value found on the least-significant 5-bits of the address bus of CPU 10. An example implementation might place the RAM device 50 at I/O addresses 00000000 through 00011111 (binary) of CPU 10. Any I/O instruction accessing the RAM 50 would select a 256-byte table within the RAM 50 by using the appropriate binary I/O address. For example, the third table would be addressed as 00000010 binary. The selection of the byte within the selected table is determined by the 8-bit value on the most-significant half of the CPU address bus. The first byte in the table would be selected by binary address 00000000, the second by 00000001, and so on. This part of the address comes from an internal data register in the CPU 10, as described above.

During an I/O read bus cycle, the CPU 10 will place the selected address on the address bus and, after a short settling period, will activate the IORQ signal by setting it to the active (low) state. This informs the I/O control decode logic 52 of the I/O devices that an I/O bus cycle is beginning. At this time the decode logic 52 samples the address bus to see which device is being accessed. If the address is within the above-mentioned range, the decode logic 52 will activate the RAM 50 by pulling the RAMCE-signal to the active low state. This begins the RAM access. Since the example is an I/O read, the CPU 10 will have activated the RD- signal that distinguishes a read from a write. This signal is connected to the OE or Output Enable input of the RAM 50, and will activate the data bus drivers of the RAM 50 to permit it to transfer data to the CPU 10.

During an I/O write bus cycle, the addresses are placed as above, the IORQ is activated, but the WR-signal is activated rather than the RD- signal. This prevents the RAM 50 from enabling its data bus output drivers in conflict with the CPU 10, whose drivers would also be "on", and causes the I/O control decode logic 52 to activate the WR control input to the RAM 50. This causes the RAM 50 to accept and store the 8-bit data value found on the CPU data bus.

In other words, during an input or output instruction, the contents of either the 8-bit accumulator register of CPU 10, or of another of its internal registers, depending upon the actual instruction, is placed on the upper half of the address bus of CPU 10. Since this 8-bit value is also connected to RAM 50, it is used to select a unique address within RAM 50. If the instruction that is to be executed is an output instruction, then the addressed location within RAM 50 is written. If the instruction to be executed is an input instruction, then the location addressed within RAM 50 is read.

Because, uniquely, Z80-type architecture "Block I/O" instructions output the changing values of the B-Register of CPU 10 during the progress of the I/O, the OTIR Block output instruction can be used to fill RAM 50 with desired data from the main memory of CPU 10. Once RAM 50 has been initialized in this way, the concept of the present invention can be implemented.

The Z80 Block output instruction works as follows. The program will have prepared the Z80 registers with information necessary to perform the transfer. The HL register contains the address of the first data byte to be sent to the I/O device. This address selects a data byte from system memory. The C register contains the address of the I/O device to be accessed. The C register selects the 256-byte table to be written, for example 00000000 binary to select the first 256-byte table. The B register contains the number of bytes to transfer, where zero means 256. When the instruction is executed, the CPU 10 presents a 16-bit address composed of the combination of the B and C registers for each I/O write cycle, the data byte from the memory location addressed by the HL register and activates the control signals described above. For this example, 255 bytes are written to the last 255 bytes of the first table. The actual transfer occurs in reverse, with the last byte being written first. Register preparation consists of loading the address of the last byte of the memory data (first byte's address plus 255) in the HL register, loading 255 into the B register and loading a zero into the C register.

The first transfer will have an address of binary 11111111 00000000, which will cause the last byte of the first table to be written. After the I/O write cycle, the CPU 10 decrements the HL register and decrements the B register. If the B register becomes zero as the result of the decrementing, the instruction terminates. If a non-zero value results from the decrement, the instruction repeats. In the next I/O write bus cycle the address is 11111110 00000000. The 8-bit value on the most-significant half of the address bus has been decremented causing the next (previous) location in the table to be specified. The data to be written comes from the next (previous) location in memory, as addressed by the HL register.

The instruction continues to repeat until the B register becomes zero after decrementing. The last byte that was written by the I/O block output instruction was actually the second byte of the table. To finish writing all of the table, i.e. to write the first byte, only the non-repeating version of the same instruction need be executed. This performs the I/O write cycle with the now-zero value of the B register on the most-significant 8 bits of the address bus.

Referring to FIG. 2, and assuming that a portion of RAM 50 has been initialized as a 256-byte translate table from EBCDIC to ASCII (two popular code sets for data communication), by placing the EBCDIC character in the A register and by executing an "input" instruction from RAM 50, the EBCDIC character is replaced in the A register by its ASCII equivalent. The 8-bit value that addressed one of the 256 bytes in RAM 50 was, in fact, the 8-bit EBCDIC character that was in the A register. Thus, by the simple addition of this external circuitry as described above, CPU 10 appears to have gained a very efficient "Translate" instruction.

In the embodiment of the invention illustrated in FIG. 2, the 8K byte RAM 50 has storage capacity for thirty-two 256-byte translate tables. As stated above, the specific table to be used in a specific translation is selected by the states of the low order 5 bits A0–A4 of the address bus of CPU 10. Thus, translate RAM 50 appears to have thirty-two different I/O addresses, corresponding to thirty-two different 256-byte translate tables.

While the above-described character translation is a good example of the general application of the present invention, there are other, equally useful applications. The most obvious is to aid in the detecting of control characters and in terminating conditions in messages being received from the communication line.

Most communications protocols have many ways in which a message may terminate. In Bisync, for example, messages may terminate with the control characters ETX or ETB, or with the character pairs DLE ETX or DLE ETB. In PARS/IPARS, there are no less than seven different characters that may terminate a message. A system that must test for each condition on an individual basis uses up much of its available processor power. This is a major source of waste in data communications systems.

By utilizing the present invention, a separate "table" may be created that has a zero value in entries corresponding to "uninteresting" data characters and a non-zero code in entries representing the "interesting" control characters. The CPU then need only translate the character through this table to determine if it is a control character that must be handled in a special way.

An alternate usage of this concept involves the creation of two translate tables. Between these two tables, the CPU may fetch the 16-bit address of a subroutine appropriate to handle any character from the data line. The entry for the "data" characters would "point" to a subroutine that simply stores the character. Entries for the "control" characters would point to special subroutines to perform the necessary control functions.

One of the least efficient functions of a data communication program in a computer involves the classification of received characters as they arrive at the computer. In most data communication protocols individual characters have important control differences depending upon their values. The traditional string of "is it this, jump if yes" tests takes up much memory and executes very slowly. This slow execution has the effect of limiting the throughput or bandwidth of the computer. By creating a table of program addresses that is organized by incoming character value, the user of the present invention can eliminate the string of tests and greatly enhance throughput. As characters arrive, the program simply "translates" the arriving character into the address of the appropriate program routine to process the character.

All protocols are state-sensitive, in that the response to a stimulus depends upon the state that exists when the stimulus is detected. If state transition tables are constructed in memory such that each entry in a table contains the identity of the next state and the address of the routine to be executed as the next state is entered, and if each entry in a table corresponds to a particular classification of stimulus, the present invention can be of use. In this case (which is not at all unusual), a translate table is constructed that categorizes the actual stimuli into classes of stimuli. The resulting translated value is used to select the entry from the current state transition table. As in character classification, this results in reduced overhead and smaller programs.

Another special-case application of the character classification involves single-character Huffman compression. Here a character is replaced by a variable-length string of bits that improves the overall throughput by using short strings for common characters and longer strings for less common characters. The present invention is utilized by constructing two translate tables that are organized by character value. The first table contains the length of the string that will be substituted for the input character; the second table contains the value of the string to substitute. By use of the invention, the program can, with just two I/O input instructions, determine the new value and its length. By combining this with the State Machine Cycling application described above, state transition tables may be constructed with each state representing a different number of bits of space in the output byte (where these substitute strings are being added). In this case the "string-length" table output value is used to select the routine to add the number of bits to the output byte, as well as the state corresponding to the amount of space left afterwards.

For example, assume a state where three bits of space are left in the output byte being constructed, and five bits of new string need to be added. The routine selected would be one that "knows" how to add the first three bits of the five-bit string to the current output byte, advance to the next location and add the remaining two bits to the next byte, resulting in six available bit locations in the new output byte. The state that becomes current is one where there is space for six bits in the output byte. The routines that are used to pack the various length strings into differing amounts of space are carefully coded to be as fast as possible. The state advancing and routine selecting feature of the invention obviates the need for slow, general-purpose routines by permitting instant selection of more efficient routines.

The concept of the present invention may also be applied in the computation of error detection polynomials. Computation of error detection polynomials usually involves shifting, comparing and Exclusive-ORing to add a new character to a partial sum. By creating an appropriate table or group of tables of values, in accordance with the present invention, this process may be greatly expedited. For example, the 6-bit coherent redundancy code (CRC) for the PARS/IPARS protocol may be updated by Exclusive-ORing the new characters with the current sum and then using that as an index into the external storage unit. The value that is retrieved from the external storage unit is the new sum, including the current character. The embodiment of the invention shown in FIG. 2 is helpful in performing this function, although the embodiment shown in FIG. 3 provides better performance.

Figure 3:
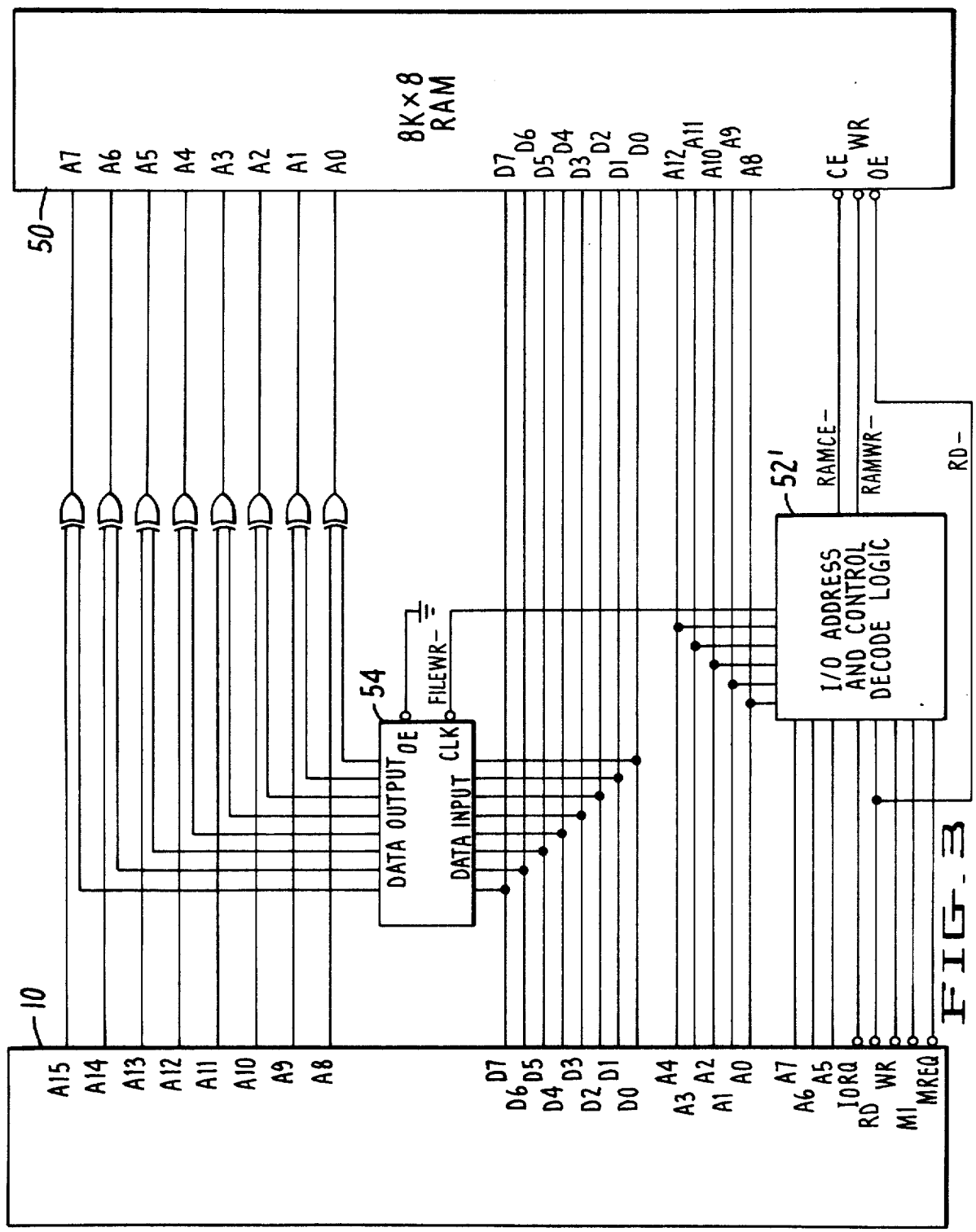
FIG. 3 is a schematic block diagram illustrating an embodiment of the present invention.

FIG. 3 shows circuitry which is more elaborate and more helpful in implementing the present invention than that shown in FIG. 2. In the embodiment shown in FIG. 3, additional storage and a feedback loop have been added to the circuitry shown in FIG. 2.

As shown in FIG. 3, an 8-bit storage register 54 may be written from the CPU 10. That is, the contents of the storage register 54 may be set to any desired value. This feature is used to initialized storage register 54 in preparation for the function to be described below.

Once initialized, storage register 54 becomes part of an Exclusive-OR, Translate, Feedback loop. With a data character in the A register of CPU 10, when an input instruction is executed, the value of the character, represented by the upper 8-bits A8–15 of the address bus, is Exclusive-ORed with the contents of the storage register 54. The result of that XOR is then applied to translate RAM 50 as the low order 8 bits of the input address of RAM 50. This selects a storage location with RAM 50, the contents of which are sent to CPU 10 to replace the current value of the A-register. The value is also latched into the storage register 54 for use with the next character. This effectively provides CPU 10 with another very powerful instruction for data communication. For example, as stated above, the 6-bit CRC and the more common longitudinal redundancy check (LRC) become single-instruction functions utilizing the circuitry shown in FIG. 3.

Figure 4:
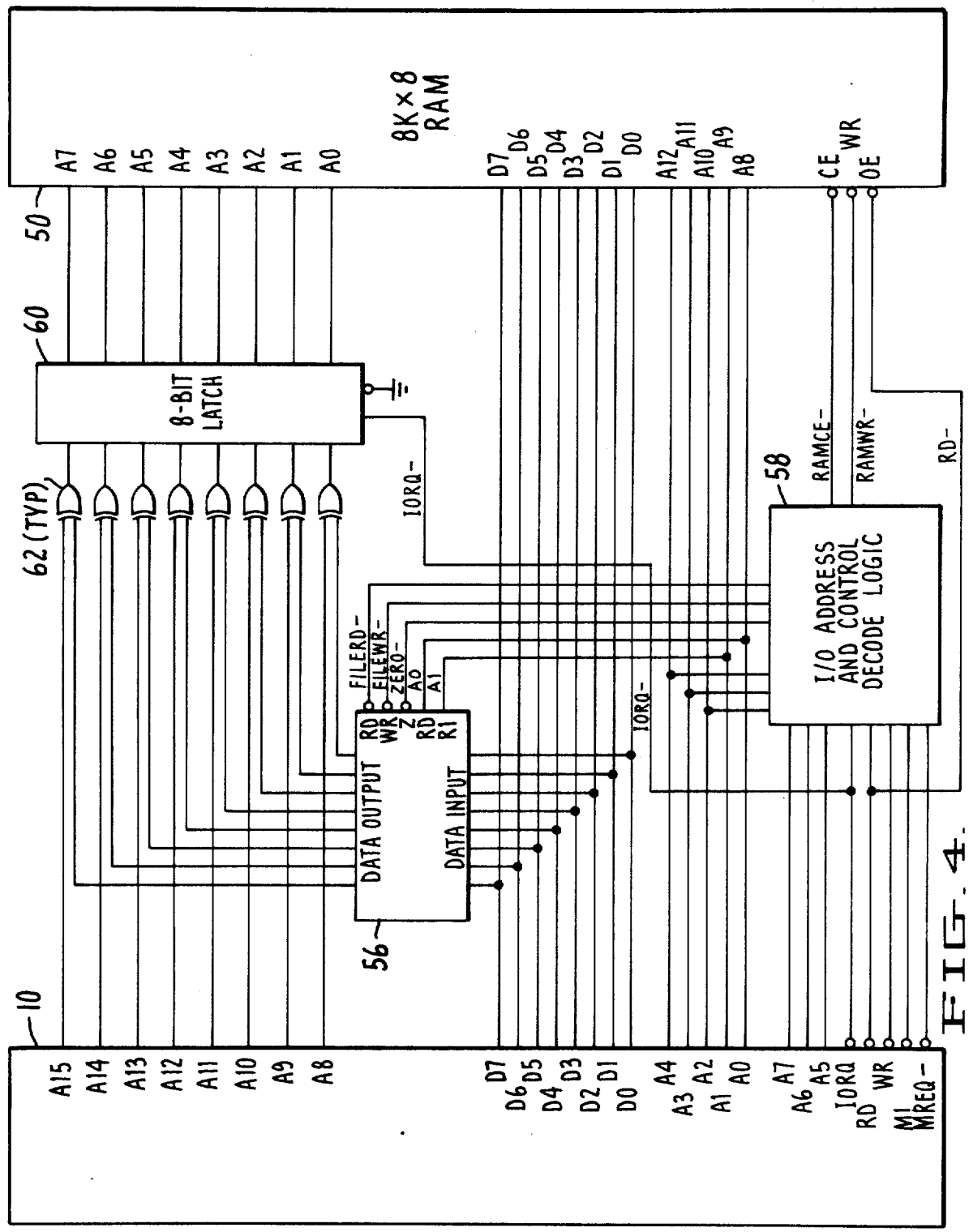
FIG. 4 is a schematic block diagram illustrating a preferred embodiment of the present invention.

FIG. 4 shows a preferred embodiment of the invention that may be used as described above as well as to implement both LRC and CRC functions. The single storage register 54 of the embodiment shown in FIG. 3 is replaced by four characters of storage in the form of a dual-ported register file 56. This permits the accumulation of up to four simultaneous CRC or LRC values without the need for loading and reloading the storage registers. Each of the four values has its own register. For purposes of simplicity and cost, the control circuitry 58 for the embodiment of the invention shown in FIG. 4 is contained in a single programmable logic device (PAL).

In this particular embodiment, the entire RAM 50 is used as translate tables. The first four tables are also available for the feedback Exclusive-OR function, when referenced by different I/O addresses. An input from an Exclusive-OR table updates the storage 56 register from the translated sum. An output to any address within the Exclusive-OR table sets the storage register 56 for that table to the contents being written. An 8-bit latch 60 is added between the output of the Exclusive-OR gates 62 and the 8-bit input A∅–A7 of RAM 50 to keep the address into RAM 50 stable, even though the contents of a register within file 56 may change as a result of an operation.

Figure 5:
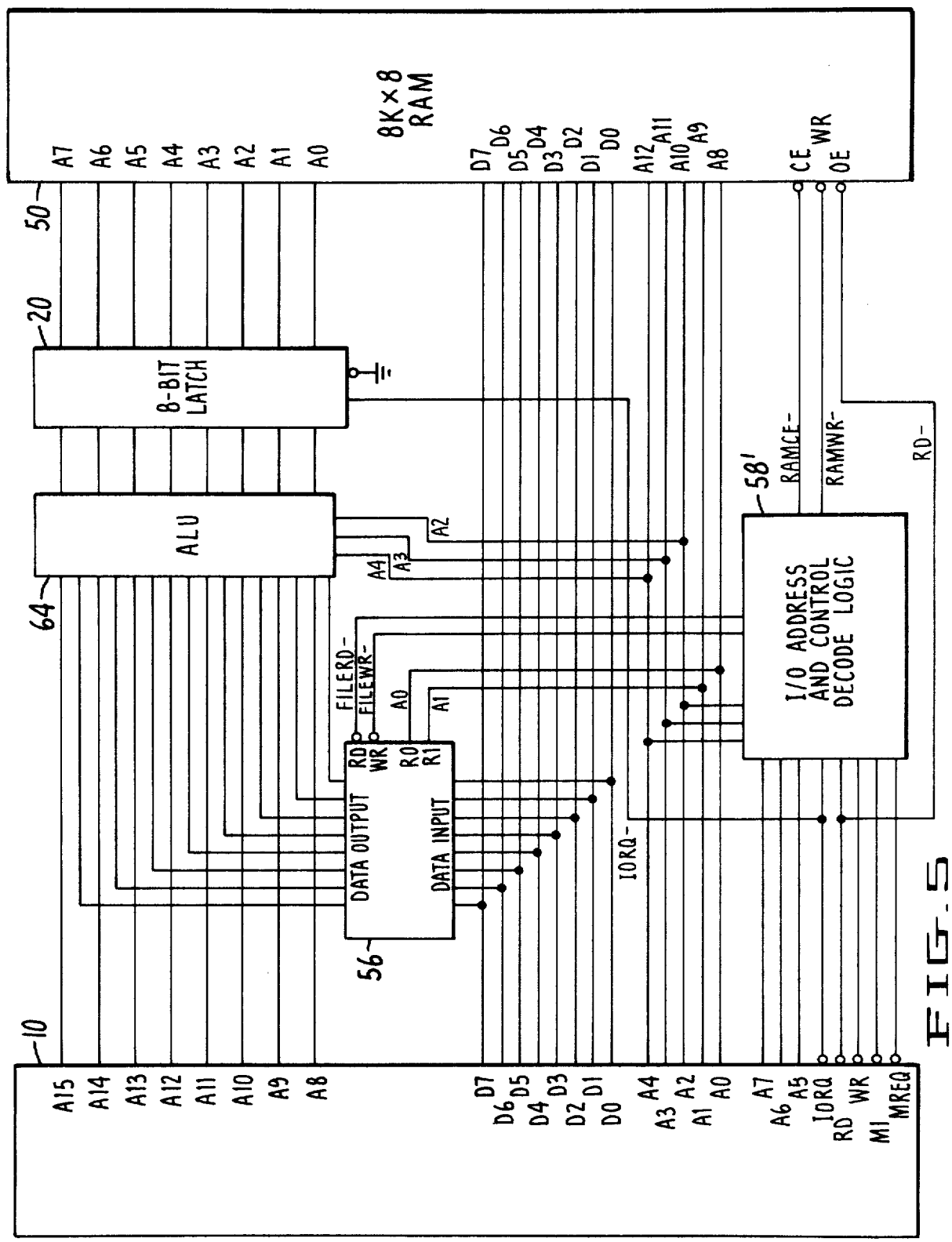
FIG. 5 is a schematic block diagram illustrating an alternative embodiment of the present invention.

FIG. 5 illustrates a more flexible implementation of the invention. In this version, the Exclusive-0R gates 62 of the FIG. 4 embodiment are replaced by an 8-bit arithmetic logic unit (ALU) 64. The ALU 64 can perform the Exclusive-OR function as well as many other arithmetic and logic functions depending upon the state of certain control signals. The table will appear to have many "aliases" within the I/O address space of CPU 10. Each alias corresponds to a different arithmetic or logical function to be performed before the translation process occurs. This flexibility is supportive of the desire of extremely fast, but malleable hardware.

While the principle object of the present invention is to enhance data communication capability of a microprocessor product, the present invention can also be helpful in any other area where computation and conditional activities must be performed on individual characters. For example, credit card account numbers are validated by an unusual arithmetic process that is moderately fast on a Z80 microprocessor. By construction and use of two tables of values, a 4:1 increase in check digit validation rate may be realized.

Additionally, a simple multiplication facility can be constructed using the present invention. If, for example, a fast "multiplied by 6" capability is needed, a table of values corresponding to the input character times 6 can be created. In this way, the character may be translated into itself multiplied by 6, or any other value. In order not to lose some high-order bits, a second table may be created to provide the most significant bits of the product.

It should be understood that various alternative to the embodiments of the invention described herein may be employed in practicing the invention. It is intended that the following claims define the scope of the invention and that the structure and methods within the scope of these claims and their equivalents be covered thereby.

What is claimed is:

1. Character translate circuitry external to a central processing unit (CPU) for enabling character translation functions, wherein the CPU performs functions on data characters in response to referenced program instructions retrieved by the CPU from a main memory storage element, and wherein the CPU includes an arithmetic logic unit for performing the functions on the data characters, at least one internal storage register for storing a data character, a data bus for transmitting and receiving data characters, and an address bus connected between the CPU and the main memory storage element for providing referenced program instruction addresses to the main memory storage element, and wherein each referenced program instruction address includes an instruction address program comprising the data character stored in the at least one internal storage register, the character translate circuitry comprising:

(a) a character translation storage unit comprising a plurality of translation character storage locations and including address input means responsive to a translation storage location address for accessing a corresponding translation character storage location; and (b) access means connected between the address bus and the character translation storage unit for providing the instruction address portion to the address input means as the storage location address, wherein the address bus comprises a most significant bit set and a low order bit set and the address input means comprises a least significant bit set and a remaining bit set, the most significant bit set being connected to the least significant bit set, the low order bit set being connected to the remaining bit set, the most significant bit set corresponding to the instruction address portion, and wherein the translation character storage locations are divided into a plurality of tables, a table to be accessed being selected by the low order bit set, selection of the translation character storage location within the selected table being determined by the most significant bit set.

2. Character translate circuitry as in claim 1 wherein the remaining bit set as well as control signals issued by the CPU are decoded by address and control decode logic connected between the CPU and the character translation storage unit to provide device selection for the translation character storage unit.

3. Character translate circuitry as in claim 2 wherein the data bus of the CPU is connected directly to a data bus of the translation character storage unit for transfer of data characters between the translation character storage unit and the CPU.

4. Character translate circuitry external to a central processing unit (CPU) for enabling data character translation functions, wherein the CPU performs functions on data characters in response to program instructions retrieved by the CPU from a main memory storage element, and wherein the CPU includes an arithmetic logic unit for performing the functions on the data characters, at least one internal storage register for storing a data character, a data bus for transmitting and receiving data characters, and an address bus connected between the CPU and the main memory storage element for providing referenced program instruction addresses for retrieval from the main memory storage element, and wherein 5. Character translate circuitry as in claim 4 wherein the data character stored in the at least one internal register comprises a character from a first code set and the data character stored in the corresponding data character storage location comprises a character from a second code set, the character from the second code set being a translated equivalent of the character from the first code set.

6. Character translate circuitry as in claim 4 wherein the data character stored in the at least one internal register comprises a control character and the data character stored in the corresponding data character storage location comprises a character indicative of whether the control character requires special handling of the CPU.

7. Character translate circuitry as in claim 4 wherein the data character stored in the corresponding data character storage location comprises the address of a subroutine for processing the data character stored in the at least one internal storage register.

8. Character translate circuitry as in claim 7 wherein the contents of the corresponding data character storage location stores an address of a subroutine that stores the data character stored in the at least one internal register.

9. Character translate circuitry as in claim 7 wherein the data character stored in the internal storage register comprises a control character and the translation data character stored in the corresponding translation character storage location in the data character storage unit is an address of a subroutine for performing necessary control functions associated with the control character.

10. Character translate circuitry as in claim 4 wherein the translation data character stored in the corresponding data character storage is an address of a program routine for processing the data character stored in the internal storage register.

11. Character translate circuitry as in claim 4 and wherein the address bus comprises a multiple bit bus including a first bit set and a second bit set and the address input means comprises a plurality of input pins including a first pin set and a second pin set, the first bit set being connected to the second pin set, the second bit set being connected to the first pin set, the first bit set corresponding to the instruction address portion.

12. Character translate circuitry as in claim 4 wherein the address bus comprises a most significant bit set and a low order bit set and the address input means comprises a least significant bit set and a remaining bit set, the most significant bit set being connected to the least significant bit set, the low order bit set being connected to the remaining bit set, the most significant bit set corresponding to the instruction address portion.

13. Circuitry external to a central processing unit (CPU) for enabling data character translation functions, wherein the CPU performs functions on data characters based upon a set of program instructions received from a main memory storage element and includes an arithmetic logic unit for perfomring the functions on the data characters, at least one internal storage register for storing data characters, a data bus booth for transferring data characters internally within the CPU and for transmitting data characters to and receiving data characters from devices external to the CPU, and an address bus for providing addresses of referenced program instructions for retrieval from the main memory storage element, and wherein the contents of the at least one internal storage register form a portion of the address of the referenced program instruction provided on the address bus, the circuitry comprising:

(a) a storage register for storing information which can be written from the CPU such that the information stored in the internal storage register may be set to a desired value by the CPU;

(b) a storage unit which includes a plurality of data character storage locations which are accessed by storage unit input addresses;

(c) means for exclusive ORing the data character stored in the internal storage register and the information stored in the storage register, the result of the exclusive OR being a storage unit address for accessing a corresponding storage location in the storage unit, the contents of which are provided both to the CPU to replace the data character stored in the internal storage register and to the storage register to replace the information stored in the storage register.

14. Character translate circuitry as in claim 13 wherein the storage register is a single character storage register.

15. Character translate circuitry external to a central processing unit (CPU) for enabling data character translation functions, wherein the CPU performs functions on data characters in response to referenced program instructions retrieved by the CPU from a main memory storage element, and wherein the CPU includes an arithmetic logic unit for performing the functions on the data characters, at least one internal storage register for storing a data character, a data bus for transmitting and receiving data characters, and an address bus connected between the CPU and the main memory storage element for providing referenced program instruction addresses to the main memory storage element, and wherein each referenced program instruction address includes an instruction address portion comprising the data character stored in the at least one internal storage register, the character translate circuitry comprising:

(a) a character translation storage unit comprising a plurality of translation character storage locations and including address input means responsive to a translation storage location address for accessing a corresponding translation character storage location; and (b) access means connected between the address bus and the character translation storage unit for providing the instruction address portion to the address input means as the storage location address, wherein the data character storage locations of the data character storage unit are organized as a plurality of tables, each table representing a class of data character, and wherein the tables are state transition tables such that a storage location in a table accessed by the data character stored in the at least one internal storage register corresponds to the identity of a next state and an address of a routine to be executed as the next state is entered.

16. Character translate circuitry external to a central processing unit (CPU) for enabling data character translation functions, wherein the CPU performs functions on data characters in response to referenced program instructions retrieved by the CPU from a main memory storage element, and wherein the CPU includes an arithmetic logic unit for performing the functions on the data characters, at least one internal storage register for storing a data character, a data bus for transmitting and receiving data characters, and an address bus connected between the CPU and the main memory storage element for providing referenced program instruction addresses to the main memory storage element, and wherein each referenced program instruction address includes an instruction address portion comprising the data character stored in the at least one internal storage register, the character translate circuitry comprising:

(a) a character translation storage unit comprising a plurality of translation character storage locations and including address input means responsive to a translation storage location address for accessing a corresponding translation character storage location; and (b) access means connected between the address bus and the character translation storage unit for providing the instruction address portion to the address input means as the storage location address, wherein the data character storage locations in the data character storage unit are organized as a plurality of tables, each table representing a class of data character, and wherein the data character stored in the at least one internal storage register accesses a storage location in each of two tables, the storage location of a first addressed table containing a length of a string that will be substituted for the data character stored in the at least one internal storage register, the storage location of a second addressed table containing the value of the substitute string, such that the data character stored in the at least one internal storage register is replaced by a variable-length string.

17. Character translate circuitry as in claim 16 wherein storage locations in the data character storage unit are organized as a plurality of state transition tables, each state representing a different number of bits of space in an output character to which the substitute strings are added, the value of the first addressed table being used to select a routine to add a number of bits to the output character and the next state corresponding to the amount of space left afterwards.

18. Circuitry external to a central processing unit (CPU) for enabling data character translation functions, wherein the CPU performs functions on data characters based upon a set of program instructions retrieved from a main memory storage element and includes a first arithmetic logic unit for performing the functions on the data characters, at least one internal storage unit for storing data characters, a data bus for both transferring data characters internally within the CPU and for transmitting data characters to and receiving data characters from devices external to the CPU, and an address bus for providing addresses of referenced program instructions for retrieval from the main memory storage element, and wherein the data character stored in the internal storage register forms a portion of the address of the referenced program instruction provided on the address bus, the circuitry comprising:

(a) a storage register for storing information which can be written from the CPU such that the information stored in the storage register may be set to a desired value by the CPU;

(b) a storage unit which includes a plurality of character storage locations which are accessed by storage unit input addresses;

(c) logic means for receiving the data character stored in the internal storage register and information stored in the storage register as inputs and which provides a storage unit input address as an output, the storage unit input address being used to access a storage location in the storage unit, the data character stored in the storage location being provided both to the CPU to replace the data character stored in the internal storage register and to the storage register to replace the information stored in the storage register.

19. Circuitry external to a central processing unit (CPU) for enabling data character translation functions, wherein the CPU performs functions on data characters based upon a set of program instructions retrieved from a main memory storage element and includes an arithmetic logic unit for performing the functions on the data characters, at least one multiple-character internal storage register for storing data characters, a data bus both for transferring data characters internally within the CPU and for transmitting data characters to and receiving data characters from devices external to the CPU, and an address bus for providing addresses of referenced program instructions for retrieval from the main memory storage element, and wherein the contents of the at least one internal storage register form a portion of the address of the referenced program instruction provided on the address bus, the circuitry comprising:

(a) a storage register for storing information which can be written from the CPU such that the internal storage register may be set to a desired value by the CPU;

(b) a storage unit which includes a plurality of data character storage locations which are accessed by storage unit input addresses;

(c) means for exclusive ORing the data character stored in the internal storage register and the information stored in the storage register, the result of the exclusive OR being a storage unit address utilizable for accessing a corresponding storage location in the storage unit, the contents of which are provided both to the CPU to replace the data character stored in the internal storage register, the information stored in the accessed storage location also being provided to the storage register to replace contents of the storage register; and (d) a latch located between the output of the exclusive OR means and the address inputs of the storage unit for maintaining the stability of the storage unit input address even though the contents of the storage register may be changing.

20. Circuitry external to a central processing unit (CPU) for enabling data character translation functions, wherein the CPU performs functions on data characters based upon a set of program instructions retrieved from a main memory storage element and includes an arithmetic logic unit for performing the functions on the data characters, at least one multiple-character internal storage unit for storing data characters, a data bus for both transferring data characters internally within the CPU and for transmitting data characters to and receiving data characters from devices external to the CPU, and an address bus for providing addresses of referenced program instructions for retrieval from the main memory storage element, and wherein the data character stored in the internal storage unit forms a portion of the address of the referenced program instruction available on the address bus, the circuitry comprising:

(a) a storage register for storing information which can be written from the CPU such that the contents of the storage register may be set to a desired value by the CPU;

(b) a storage unit which includes a plurality of data character storage locations which are accessed by storage unit input addresses;

(c) logic means for receiving the data character stored in the internal storage register and the information stored in the storage register as inputs and which provides a storage unit input address as an output, the storage unit input address being used to access a storage location in the storage unit, the data character stored in the storage location being provided to the CPU to replace data characters stored in the internal storage unit and also to the storage register to replace the information stored in the storage register; and (d) a latch located between the output of the logic means and the address inputs of the storage unit for maintaining the stability of the storage unit input address even though the contents of the storage register may be changing.

* * * * *